(12) United States Patent
Landes et al.

(10) Patent No.: US 8,414,042 B2
(45) Date of Patent: Apr. 9, 2013

(54) ARTICULATING PACKAGE PALLETIZING SYSTEM

(75) Inventors: Paul Landes, Lee's Summit, MO (US); Willie Mocabee, Rochester Hills, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 245 days.

(21) Appl. No.: 12/248,229

(22) Filed: Oct. 9, 2008

(65) Prior Publication Data

US 2009/0097956 A1    Apr. 16, 2009

Related U.S. Application Data

(60) Provisional application No. 60/980,006, filed on Oct. 15, 2007.

(51) Int. Cl.
  *B25J 15/00*     (2006.01)
  *B66C 1/30*      (2006.01)

(52) U.S. Cl.
  USPC ............................ 294/2; 294/67.31; 294/106

(58) Field of Classification Search ........... 294/3, 67.22, 294/67.31, 107, 108, 198, 206, 2, 106
  See application file for complete search history.

(56) References Cited

U.S. PATENT DOCUMENTS

| | | | |
|---|---|---|---|
| 2,784,923 A * | 3/1957 | Sepke | 294/67.32 |
| 3,001,812 A * | 9/1961 | Anderson | 294/67.31 |
| 3,651,957 A * | 3/1972 | Ball et al. | 414/226.02 |
| 4,273,506 A | 6/1981 | Thomson et al. | |
| 4,592,692 A * | 6/1986 | Suizu et al. | 414/792.8 |
| 4,828,304 A * | 5/1989 | No et al. | 294/2 |
| 5,024,575 A * | 6/1991 | Anderson | 414/627 |
| 5,752,729 A * | 5/1998 | Crozier et al. | 294/2 |
| 5,884,952 A | 3/1999 | Chadwick | |
| 7,032,944 B2 | 4/2006 | Moilanen et al. | |
| 7,125,059 B2 | 10/2006 | Miyamoto | |
| 7,370,895 B2 * | 5/2008 | Imai | 294/2 |
| 2006/0290153 A1 | 12/2006 | Delescluse | |

FOREIGN PATENT DOCUMENTS

| | | |
|---|---|---|
| DE | 102 47 362 | 4/2004 |
| EP | 0 569 674 | 11/1993 |
| EP | 1 258 448 | 12/2003 |
| GB | 1 279 486 | 6/1972 |
| GB | 2 123 378 | 2/1984 |
| JP | 60-077029 | 5/1985 |
| JP | 04-020423 | 1/1992 |
| JP | 07-328976 | 12/1995 |
| WO | WO 2005/100157 | 10/2005 |

* cited by examiner

*Primary Examiner* — Dean Kramer
(74) *Attorney, Agent, or Firm* — Harness, Dickey & Pierce, P.L.C.

(57) ABSTRACT

A package moving system has a jaw device movable between an open and a closed position. The jaw has a pair of opposite support structures that each support at least one support arm. The at least one support arm moves between a first and second position. In the first position, it receives a package. In the second, it supports the package. At least one retaining member is biased downward to engage the package when the jaws are in a closed position. The retaining element urges against an upper surface of the supported package to retain the package in the support arms.

13 Claims, 5 Drawing Sheets

ARTICULATING PACKAGE PALLETIZING SYSTEM

CROSS-REFERENCE TO RELATED APPLICATIONS

This application claims the benefit of U.S. Provisional Application No. 60/980,006, filed on Oct. 15, 2007. The entire disclosure of the above application is incorporated herein by reference.

FIELD AND BACKGROUND

The present disclosure provides an articulatable package palletizing system that has lifting jaws that open to receive a package thereat and that close to move support elements or arms under the package to support and lift and move the package. The palletizing system includes one or more restraining or retaining elements that provide downward pressure on the supported package to limit movement of the package on the support arms.

SUMMARY

According to an aspect of the present disclosure, a package palletizing system includes a jaw device and at least one retaining element. The jaw device is movable between an open position and a closed position. The jaw device includes a pair of opposite support structures that each support at least one support arm, whereby the at least one support arm of each support structure moves between an open position, for receiving a package therebetween, and a closed position, where the arms are positioned under the package for supporting the package. The at least one retaining element is biased downward and is configured to engage an upper portion of the package supported by the support arms when the jaw device is in the closed position. The at least one retaining element is urged against an upper portion of the supported package to retain the supported package in position on the support arms.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
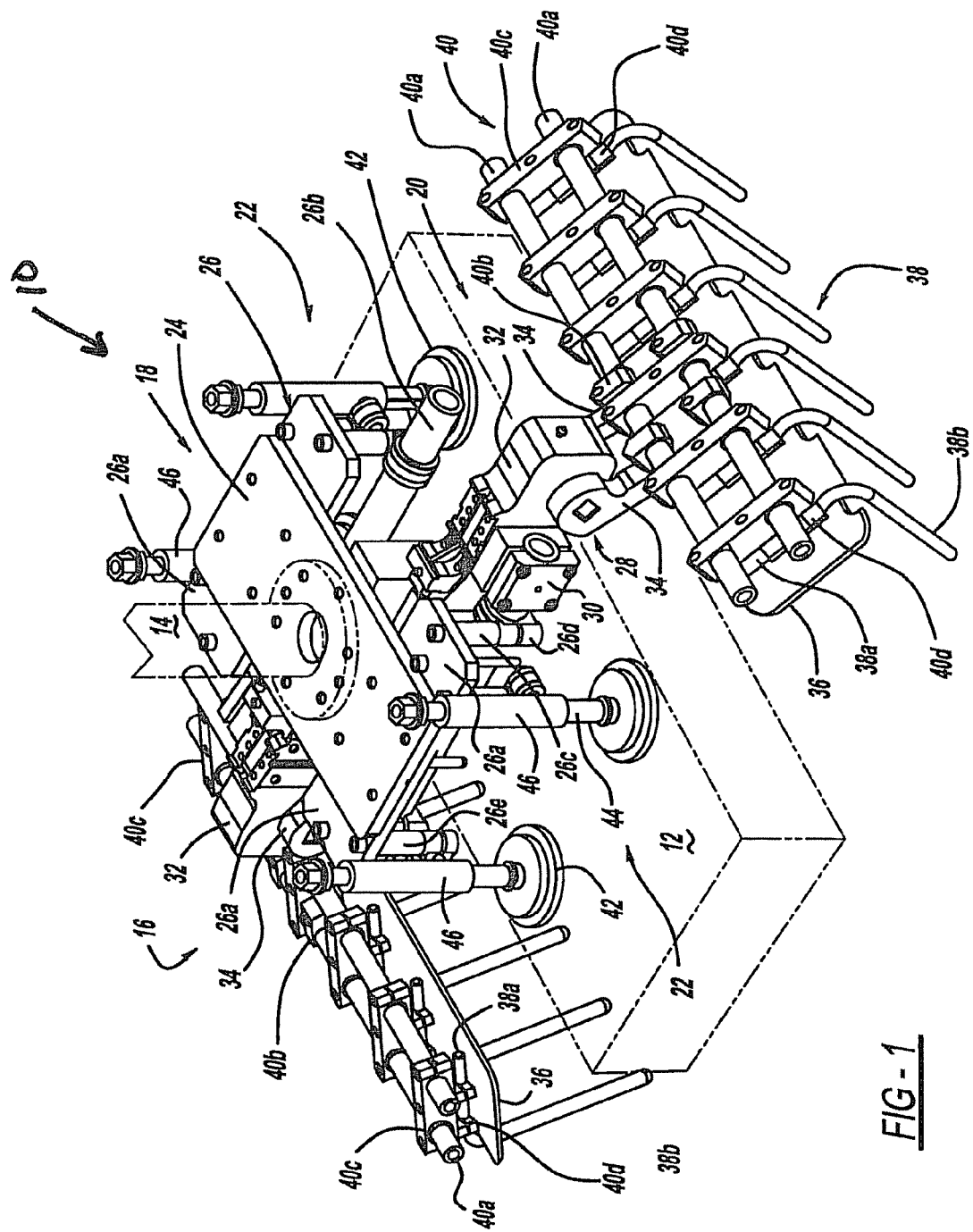
FIG. 1 is a perspective view of an articulating package palletizing system with the jaws of the palletizing system in an open position.
Figure 2:
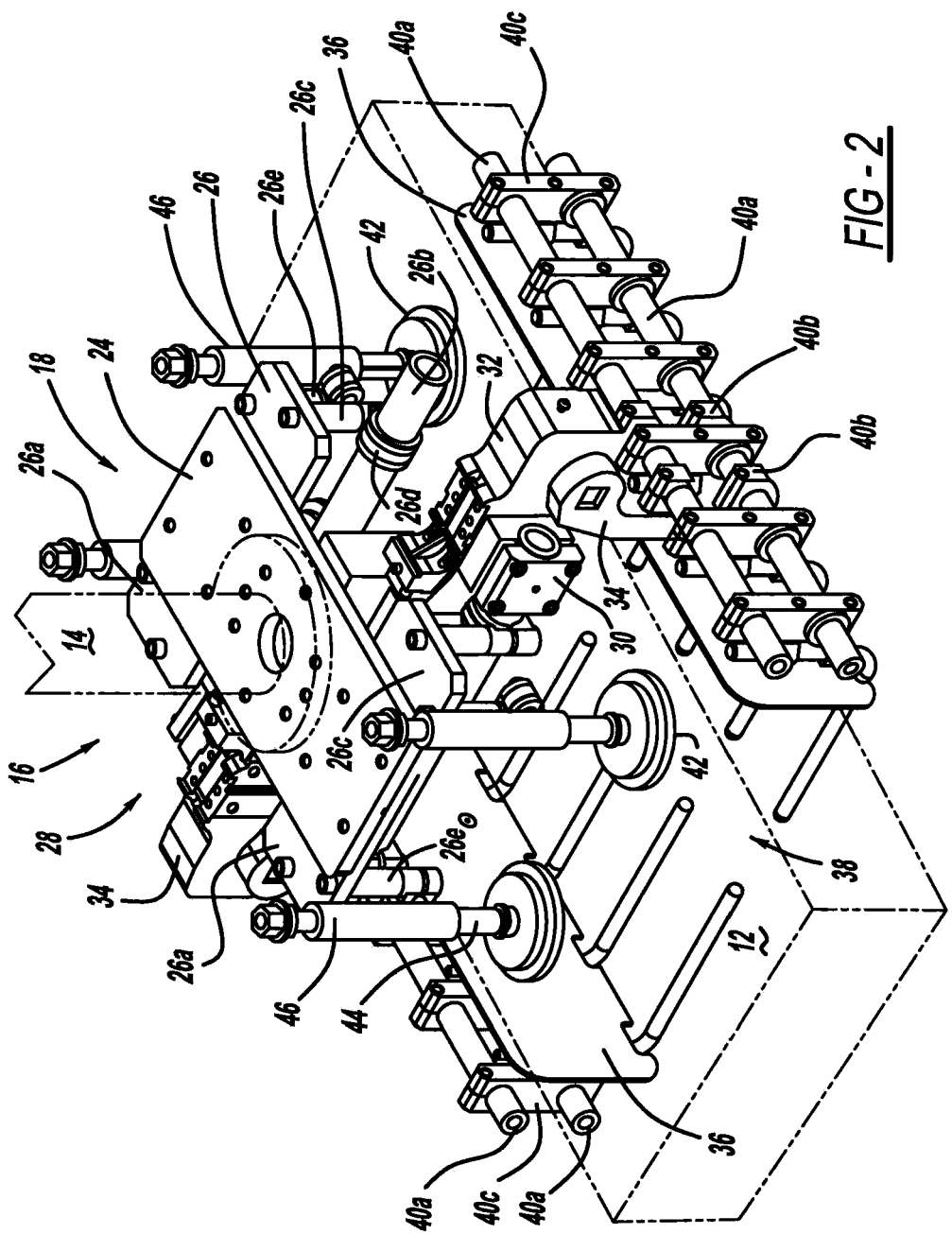
FIG. 2 is a perspective view of the articulating package palletizing system of FIG. 1, with the jaws in a closed position.

Referring now to the drawings and the illustrative embodiments depicted therein, an articulatable package palletizing system 10 is operable to lift and support and move a package 12, such as a bag of items (FIGS. 1 and 2). Package palletizing system 10 includes a robot device or control unit 14 that is operable to move and/or control a package receiving and lifting device 16 to lift and move a package 12. Package receiving and lifting device 16 includes a mounting assembly 18, a power jaw device or mechanism 20 that opens and closes to receive and lift and move a package, and at least one retaining element 22 to retain the received package during lifting and moving of the package, as discussed below. The power jaw device 20 is opened to receive a package therein (such as via movement of the package receiving and lifting device to the package by the robot or control unit 14) and closed to support the package for moving the package (such as for lifting and moving the package via the robot or control unit), as also discussed below.

Mounting assembly 18 may comprise any suitable mounting structure or interface for mounting the package receiving and lifting device 16 to the robot or control unit 14. In the illustrated embodiment, the mounting assembly 18 comprises a generally planar mounting plate element 24 to which a pair of mounting structures 26 are mounted, whereby each mounting structure 26 is configured to mount and support a respective clamping device or jaw mechanism or pivot mechanism 28 of the power jaw device 20 and one or more retaining elements 22, such as at an underside of the mounting plate element 24.

In the illustrated embodiment, the mounting structures 26 comprise plate portions 26a that each support a respective support rod 26b that extends laterally across the mounting plate element 24. The mounting structure 26 supports the respective support rod 26b via a support arm 26c and clamping element 26d, whereby the respective pivot mechanism 28 may be adjustably mounted to or clamped to the support rod 26b so as to allow for lateral adjustment of the mounting location of the pivot mechanisms 28 relative to the mounting assembly 18. The mounting structure 26 also support a support arm 26e for mounting a respective retaining element 22 thereto. The mounting plate element 24 is mountable to any suitable robotic device or control unit or power unit or the like that is operable to move the package receiving and lifting device 16 and/or to control the power jaw device 20 of the package receiving and lifting device 16, such as discussed below.

Power jaw device 20 comprises a power clamp having oppositely extending pivot mechanisms or devices 28 mounted to respective support rods 26b (such as via a clamping element 30) and extending from the opposite sides of mounting assembly 18. In the illustrated embodiment, each pivot mechanism 28 includes a motorized or powered pivot device 32 that is operable to pivot a clamping arm or arms 34 about a generally horizontal pivot axis. The clamping arms 34 are mounted or secured to a support plate 36 that extends generally along a side region of the package receiving and lifting device 16.

The powered pivot device 32 is actuated by a pneumatic cylinder, electric motor or other suitable device that causes the pivot mechanism 28 to rotate about a horizontal axis. The pivot mechanism 28 rotates arms 34 through an angle up to 120°. The angle can be limited by the use of an internal stroke limiting device to reduce the opening angle of the support arms 38. When the arms 34 are in the vertical or clamped position, a toggle or cam mechanism (not shown), internal to the powered pivot device 32, locks the arms 34 in the vertical position shown in FIGS. 2 and 3. Once locked by the toggle or cam mechanism, internal to the powered pivot device 32, if a loss of pneumatic or electric power occurs, the arms 34 are prohibited from rotating out of the vertical or clamped position and thus prevent the loss of the package 12. An integrated sensor device on the powered pivot device 32 contains sensors to monitor the opening and closing or clamped position of the arms 34. Thus, no expensive external sensors and/or special brackets are required.

Figure 3:
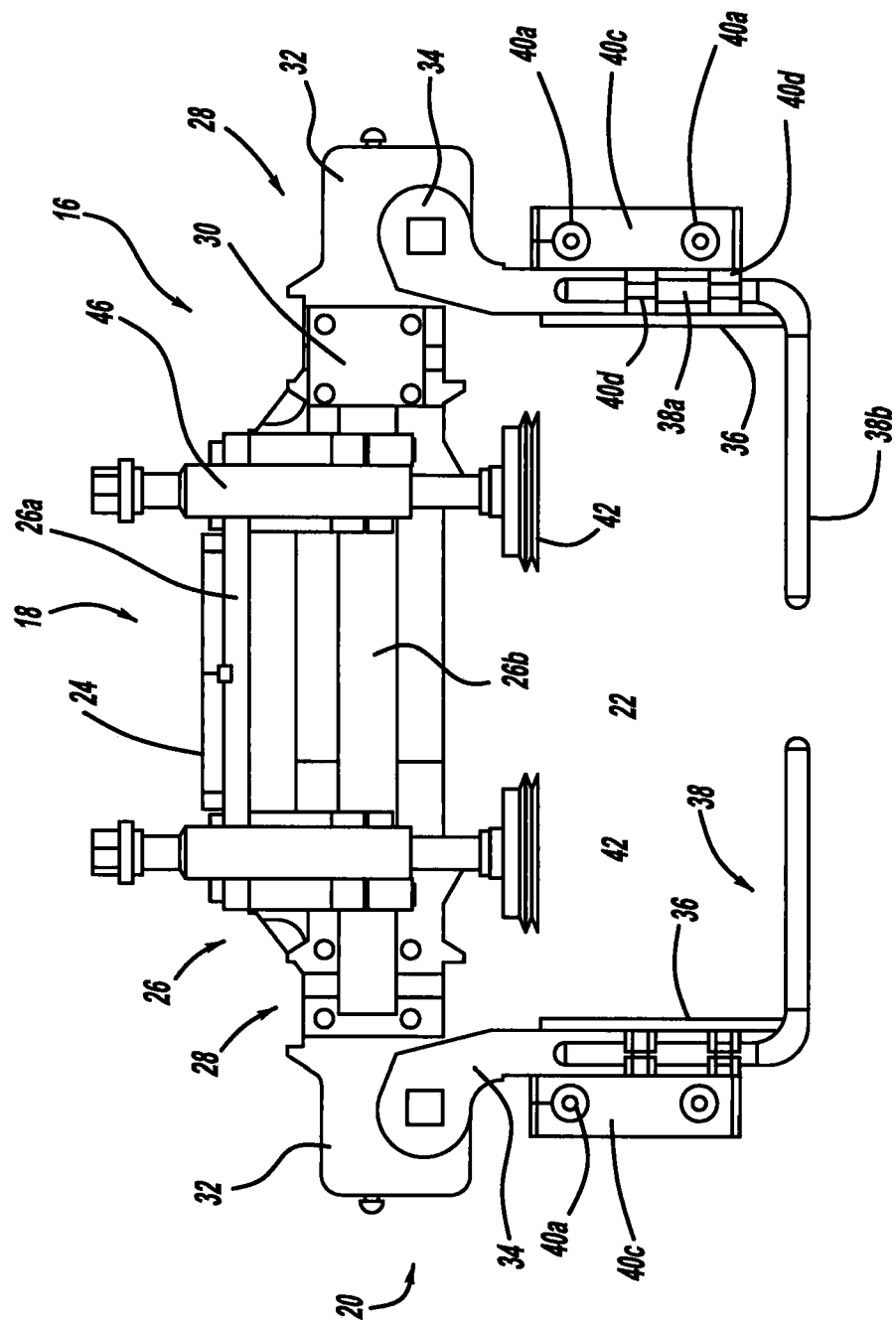
FIG. 3 is an end elevation of the articulating package palletizing system of FIG. 2.
Figure 4:
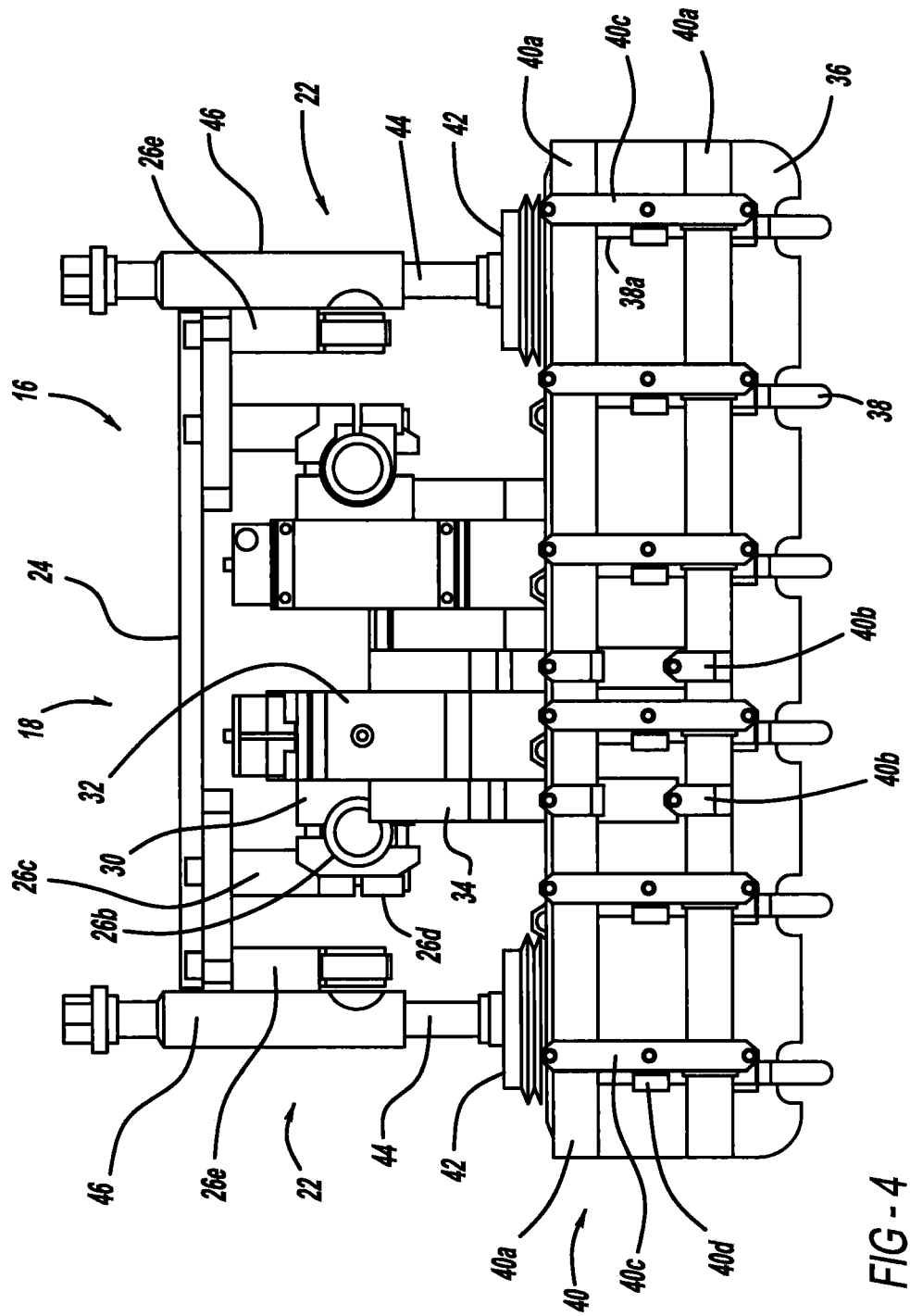
FIG. 4 is a side elevation of the articulating package palletizing system of FIG. 2.
Figure 5:
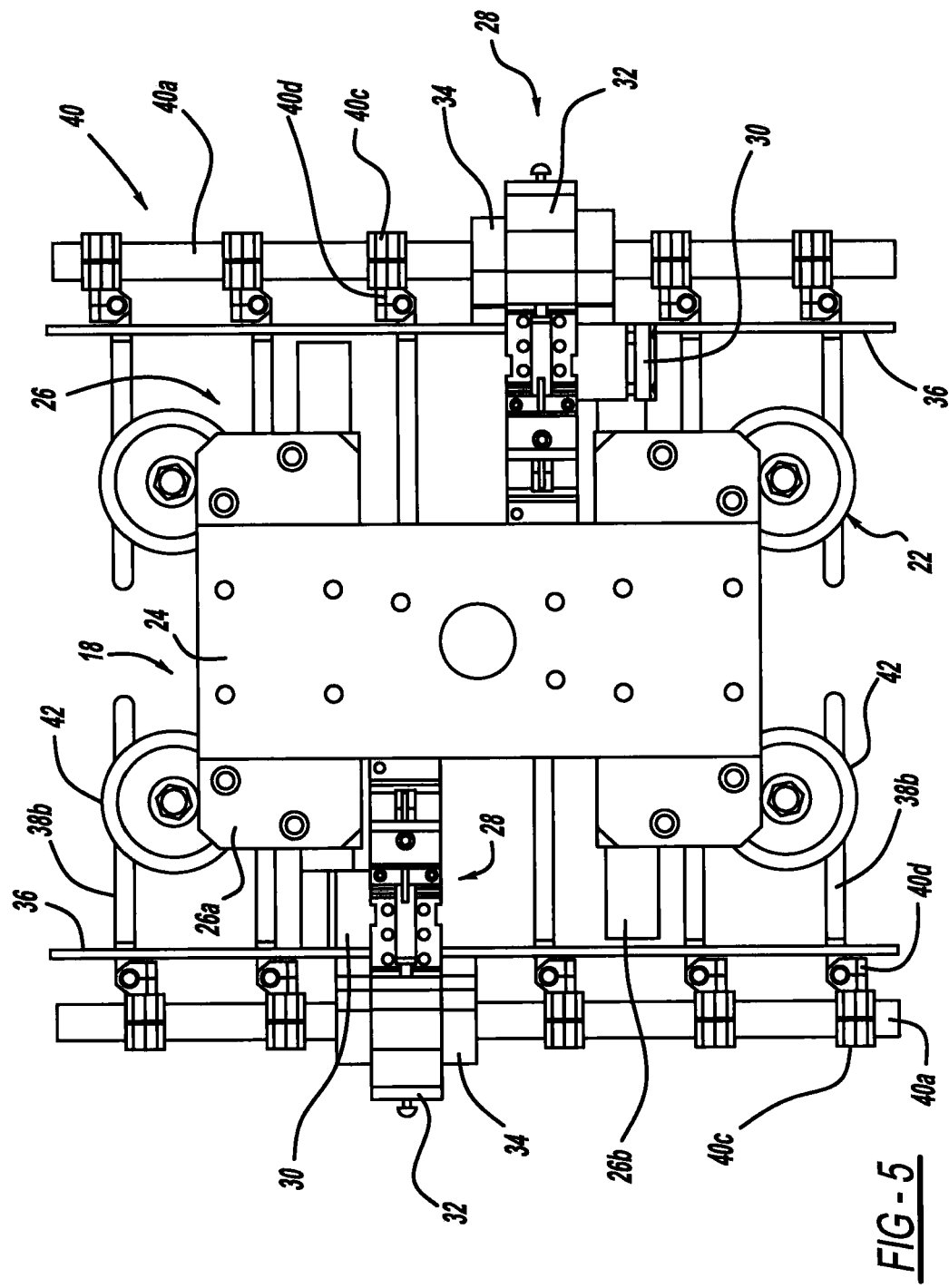
FIG. 5 is a top plan of the articulating package palletizing system of FIG. 2.

Clamping arm or arms 34 also supports a plurality of support arms or elements 38 to engage and support the package 12. In the illustrated embodiment, the support arms 38 comprise angled or bent arms, tubes or rods. A first or upper portion 38a is adjustably mounted to clamping arms 34. A second or lower portion 38b is angled (such as at about a 90 degree angle or thereabouts) relative to upper portion 38a. Thus, the lower portions 38b of support arms 38 are positioned generally horizontally and below a package to be lifted by the package receiving and lifting device 16, such as when the power jaw mechanism is in its closed position or orientation as seen in FIGS. 2 and 3.

In the illustrated embodiment, support arms 38 are adjustably mounted to clamping arms 34 via a mounting assembly 40 having a pair of support rods or tubes 40a extending generally along support plate 36. Support rods 40a are mounted to clamping arms 34 via respective clamping elements 40b, while support arms 38 are mounted to support rods 40a via respective clamping elements 40c (which clamp to support rods 40a) and clamping elements 40d (which clamp to upper portions 38a of support arms 38). The clamping elements 40c, 40d may be moved longitudinally along support rods 40a to adjust a location of the support arms 38 relative to the clamping arms 34. Also, the support arms 38 may be vertically adjusted relative to the clamping arms 34 via adjustment of the clamping elements 40d to allow the horizontal portions or lower portions of the support arms 38 to be adjusted to accommodate different sized packages. For example, the support arms 38 may be lowered or adjusted to a greater depth (or greater distance between the lower arm portions 38b and the retaining elements 22) to receive and lift larger or higher profile packages or the like, while the retaining element or elements 22 engage the upper portion of the package.

Retaining elements 22 are configured to engage the upper portion of the package that is supported by the support arms (when the jaw mechanism is closed) to urge the package downward and against the support arm to resist movement of the package along the support arms or across the support arms and thus to substantially retain the package in position at the support arms. In the illustrated embodiment, the retaining elements comprising a plurality of engaging elements or portions or cups 42 (such as rubber or elastomeric suction cups or the like). They are spring-loaded or biased, such as via a biasing element or spring that urges a shaft portion 44 and cup 42 downward relative to a mounting collar or housing 46 mounted to support arm 26e of mounting structure 26 of mounting assembly 18. Thus, the cups or engaging portions 42 of retaining elements 22 are urged generally downwardly relative to mounting assembly 18. The engaging portions 42 are urged into engagement with an upper portion of a package or bag supported by the support arms 38 of package lifting and supporting device 16. Although shown as elastomeric cups, the engaging elements may comprise any suitable retaining means, such as rubber elements or the like, that are suitable to be urged against the upper portion of a supported package to limit movement of the package relative to the support arms 38, while remaining within the spirit and scope of the present disclosure.

Thus, the package palletizing system 10 of the present disclosure is operable to move the lifting and supporting device 16 toward a package 12 to move the jaws 20 and support arms 34 toward the package (such as a bag of nuts or other items on a pallet or the like). The jaws 20 and arms 34 are initially in an open position or orientation (such as shown in FIG. 1) to receive the package 12 between the spaced apart or open support arms 34. When the jaws 20 and arms 34 open, the device may be positioned at the package. A robot lowers the device 16 downward toward the package with the package received between the open or spread apart arms 34. When positioned at the package (such as when the retaining elements are urged against the upper portion of the package), the jaws 20 may be articulated toward the closed position or orientation (such as shown in FIGS. 2-5). The support arms 34 are moved so as to be generally underneath the package with the side support plates 36 generally along the sides of the bag or package 12 to limit movement of the package. The spacing between the spaced apart support arms 34 may be selected to enable the arms to move between the pallet slats or boards. This enables ready movement under the package as the lifting and moving device is moved toward the package and/or the clamping or jaw devices are moved or pivoted or articulated toward the closed position.

As the lifting and supporting device 16 is moved toward the package 12, the retaining elements 22 are also moved toward and into engagement with an upper portion of the package. Thus, when the jaws 20 are closed to move the horizontal or lower portions of the support arms 38 underneath the package, the retaining elements 22 are urged against the upper portion of the package to retain the package between the support arms 38 and the retaining elements 22. The package 12 may then be lifted and moved (such as via operation of the robot or control unit 14) toward a targeted location or pallet. The jaws may be opened to deposit the package at the targeted location or pallet. The lifting and supporting device 16 may be moved away toward another package that is to be lifted and moved by the package palletizing system 10.

Therefore, the present disclosure provides a package lifting and supporting device or system that may be automatically moved or controlled to engage and lift an object or package (such as a porous package or bag), while retaining the package on the lifting and supporting device. This limits or substantially precludes the possibility of the package moving on the supporting device or falling off of the supporting device during the movement of the package. The present disclosure thus provides enhanced handling of porous packages, such as burlap bags or sacks and/or the like, without the need for manual lifting of such packages. Thus, it provides a safer means for lifting and moving such packages, while limiting dislodging of the packages by the lifting and moving device. Additionally, due to locking the arms in place, accidental dropping of the packages is limited by the lifting and moving device as the lifting and moving device moves the picked up and supported package from a pick up location or pallet to a targeted or drop off location or pallet.

Changes and modifications to the specifically described embodiments may be carried out without departing from the principles of the present disclosure, which is intended to be limited only by the scope of the appended claims, as interpreted according to the principles of patent law.

What is claimed is:

1. A package moving system comprising:

a jaw device that is movable between an open position and a closed position, said jaw device comprising a powered device providing powered rotating movement for moving the jaw device, a pair of opposite support structures that each support at least one support arm, the pair of opposite support structures each movably and independently coupled directly with the powered device, the powered device includes a powered pivot device, the powered pivot device includes a pivot pin that is rotated about an axis to directly provide rotary movement from the powered pivot device, about the pivot pin, to the at least one support arm of each support structure, said at least one support arm of each support structure moves between an open position, for receiving a package, and a closed position, where said arms are positioned under the package for supporting the package; and at least one retaining element that is biased downward and is configured to engage the package supported by said support arms when said jaw device is in said closed position, said at least one retaining element being urged against an upper portion of the supported package to retain the supported package in position on said support arms.

2. The package moving system of claim 1, wherein said opposite support structures are pivotable between said open and closed positions.

3. The package moving system of claim 1, wherein said at least one support arm comprises a plurality of support arms mounted to the respective support structure.

4. The package moving system of claim 3, wherein said support arms are adjustably mounted to the respective support structures.

5. The package moving system of claim 1, further comprising a robotic device for moving said jaw device and said retaining elements to receive a package and lift and support and move the package.

6. The package moving system of claim 1, wherein said support arms comprise angled arms that have a first portion that extends generally downwardly from said support structure when said jaw device is in said closed position and a second portion that extends generally horizontally from a lower end of said first portion when said jaw device is in said closed position.

7. The package moving system of claim 1, wherein the powered device locking said pair of support structures in said closed position.

8. A package moving system comprising:

a jaw device that is movable between an open position and a closed position, the jaw device comprising a pair of powered pivot devices for providing rotary movement, a pair of opposite support structures that each support at least one support arm, the opposite support structure each rotatably movably coupled directly with one of the pair of powered pivot devices, the pair of powered pivot devices each include a powered pivot device, each powered pivot device includes a pivot pin that is rotated about an axis to directly provide pivoting movement from the powered pivot device, about the pivot pin, to the at least one support arm of each support structure, the at least one support arm of each support structure moves between an open position, for receiving a package, and a closed position, where the arms are positioned under the package for supporting the package; and at least one retaining element that is biased downward and is configured to engage the package supported by the support arms when said jaw device is in the closed position, the at least one retaining element being urged against an upper portion of the supported package to retain the supported package in position on the support arms.

9. The package moving system of claim 8, wherein said at least one support arm comprises a plurality of support arms mounted to the respective support structure.

10. The package moving system of claim 9, wherein the support arms are adjustably mounted to the respective support structures.

11. The package moving system of claim 8, further comprising a robotic device for moving said jaw device and the retaining elements to receive a package and lift and support and move the package.

12. The package moving system of claim 8, wherein the support arms comprise angled arms that have a first portion that extends generally downwardly from the support structure when the jaw device is in the closed position and a second portion that extends generally horizontally from a lower end of the first portion when the jaw device is in the closed position.

13. The package moving system of claim 8, wherein the pair of powered pivot devices locking the pair of support structures in the closed position.

\* \* \* \* \*